(12) United States Patent
Kielb et al.

(10) Patent No.: US 9,677,919 B2
(45) Date of Patent: Jun. 13, 2017

(54) GAUGE DISPLAY SYSTEM

(71) Applicant: Rosemount Inc., Chanhassen, MN (US)

(72) Inventors: John Allan Kielb, Eden Prairie, MN (US); Cory Michael Robinson, Mayer, MN (US)

(73) Assignee: Rosemount Inc., Shakopee, MN (US)

(*) Notice: Subject to any disclaimer, the term of this patent is extended or adjusted under 35 U.S.C. 154(b) by 157 days.

(21) Appl. No.: 14/554,817

(22) Filed: Nov. 26, 2014

(65) Prior Publication Data

US 2016/0146645 A1   May 26, 2016

(51) Int. Cl.

| | |
|---|---|
| *G01D 13/22* | (2006.01) |
| *G01D 7/00* | (2006.01) |
| *G05B 19/00* | (2006.01) |
| *G01L 19/10* | (2006.01) |
| *G01L 19/16* | (2006.01) |
| *G01L 19/08* | (2006.01) |

(52) U.S. Cl.
CPC .............. *G01D 13/22* (2013.01); *G01D 7/00* (2013.01); *G05B 19/00* (2013.01); *G01L 19/083* (2013.01); *G01L 19/10* (2013.01); *G01L 19/16* (2013.01)

(58) Field of Classification Search
CPC .......... G01D 13/22; G01D 7/00; G01L 19/10; G01L 19/16; G01L 19/083; G05B 19/00
USPC ........ 116/201, 264, 272–274, 276, 291, 271, 116/284, 289, 292; 73/384; 340/3.7, 688
See application file for complete search history.

(56) References Cited

U.S. PATENT DOCUMENTS

| | | | | |
|---|---|---|---|---|
| 3,375,718 A | * | 4/1968 | Robinson | G01L 19/0007 73/715 |
| 3,625,060 A | * | 12/1971 | McCallion et al. | G01R 17/00 73/384 |
| 3,654,808 A | * | 4/1972 | Fukumoto | G01L 19/08 116/303 |
| 3,815,419 A | * | 6/1974 | Springer | G01O 5/005 73/384 |
| 4,777,480 A | * | 10/1988 | Okamoto | B60Q 3/004 340/450 |
| 4,777,827 A | | 10/1988 | Brodetsky | |
| 4,969,358 A | * | 11/1990 | Peet, II | G01O 5/06 73/1.62 |

(Continued)

FOREIGN PATENT DOCUMENTS

WO    WO2011130367 A1    10/2011

OTHER PUBLICATIONS

International Search Report and Written Opinion from PCT Application Serial No. PCT/US2015/056945, dated Jan. 7, 2016, 16 pages.

*Primary Examiner* — R. A. Smith
*Assistant Examiner* — Tania Courson
(74) *Attorney, Agent, or Firm* — Kinney & Lange, P.A.

(57) ABSTRACT

A gauge system comprises a sensor that produces a sensor signal as a function of a sensed parameter. The gauge system also comprises a motor and a gauge having a scale and a movable indication needle that is driven by the motor and displays a measurement value of the sensed parameter based upon position of the needle relative to the scale. The gauge system further includes a position sensor that produces a position feedback signal representative of a sensed position of the needle and a controller that provides drive commands to the motor based on the sensor signal and the position feedback signal.

18 Claims, 6 Drawing Sheets

(56) References Cited

U.S. PATENT DOCUMENTS

| | | | | |
|---|---|---|---|---|
| 5,054,653 A * | 10/1991 | McNab | | G01D 5/44 |
| | | | | 222/28 |
| 5,121,109 A * | 6/1992 | Murphy, Jr. | | G01D 13/26 |
| | | | | 335/205 |
| 5,231,508 A * | 7/1993 | Murphy, Jr. | | G01D 5/145 |
| | | | | 338/12 |
| 5,349,866 A | 9/1994 | Huang | | |
| 5,841,359 A * | 11/1998 | Grilk | | B60R 16/0232 |
| | | | | 340/438 |
| 5,982,168 A * | 11/1999 | Westberg | | G01P 1/08 |
| | | | | 324/160 |
| 6,394,977 B1 | 5/2002 | Taylor | | |
| 6,410,863 B1 * | 6/2002 | Cappiello | | G01G 19/44 |
| | | | | 177/25.13 |
| 7,034,496 B2 * | 4/2006 | Oishi | | H02P 8/34 |
| | | | | 318/696 |
| 7,082,842 B2 * | 8/2006 | Kielb | | G01F 1/42 |
| | | | | 73/861.53 |
| 7,117,746 B2 | 10/2006 | Yeh | | |
| 7,165,461 B2 | 1/2007 | Ferguson | | |
| 7,256,702 B2 | 8/2007 | Isaacs | | |
| 7,493,813 B2 * | 2/2009 | Nunes | | G01L 19/083 |
| | | | | 73/384 |
| 7,612,660 B1 * | 11/2009 | Sullivan | | B60Q 9/00 |
| | | | | 340/461 |
| 7,714,740 B2 | 5/2010 | Lipman | | |
| 7,814,932 B2 | 10/2010 | Stinson | | |
| 8,402,833 B2 | 3/2013 | Alfano | | |
| 8,669,856 B2 * | 3/2014 | Wang | | G01P 1/08 |
| | | | | 340/438 |
| 2007/0089508 A1 | 4/2007 | Allmendinger | | |
| 2007/0295092 A1 | 12/2007 | Chen | | |
| 2008/0190196 A1 | 8/2008 | Nunes et al. | | |
| 2009/0272313 A1 * | 11/2009 | Ballard | | G01D 7/005 |
| | | | | 116/28 R |
| 2010/0162822 A1 * | 7/2010 | Ward | | G01L 9/0029 |
| | | | | 73/733 |
| 2012/0240659 A1 | 9/2012 | Alfano | | |
| 2012/0240685 A1 | 9/2012 | Alfano | | |
| 2013/0106574 A1 * | 5/2013 | Kyberd | | G08B 27/00 |
| | | | | 340/6.1 |
| 2013/0160561 A1 | 6/2013 | Chen | | |
| 2014/0239151 A1 * | 8/2014 | Schumacher | | G01D 5/26 |
| | | | | 250/206.1 |

* cited by examiner

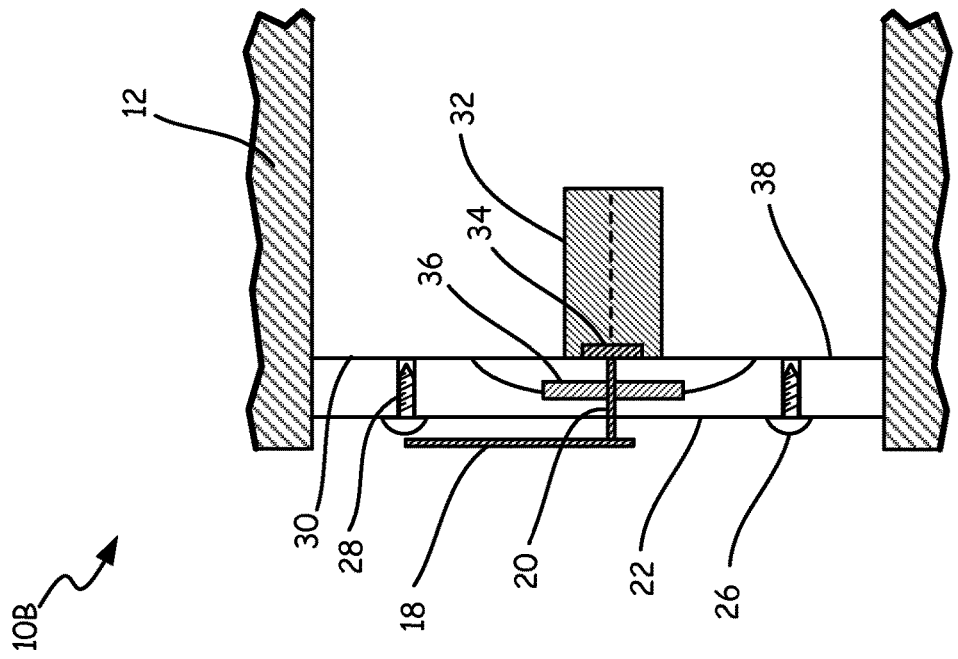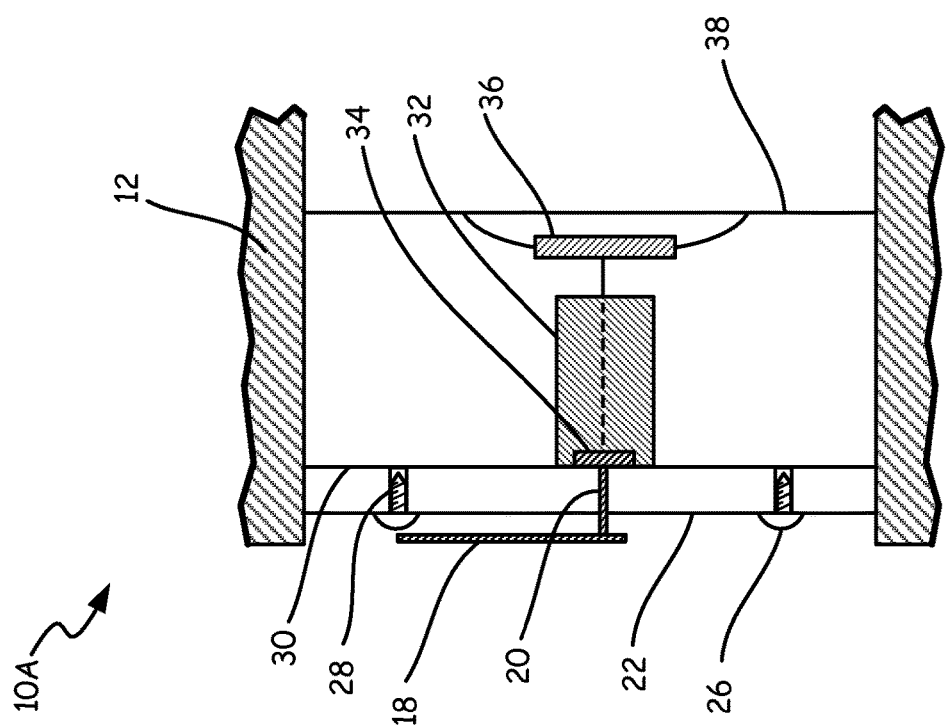

GAUGE DISPLAY SYSTEM

BACKGROUND

The present invention relates generally to gauges. In particular, the present invention relates to a gauge system featuring an analog display of a digital source signal.

Analog gauges are prevalent in many industries from process management to HVAC to aviation. Some of the more common gauges include an indication needle against a background scale. The position of the needle relative to the scale indicates a measurement of a condition. The conditions displayed often are that of a process or a system.

One example of a common practice is to use a gauge to display the pressure of a process fluid. In a typical example, this was only accomplished by taking a pressure reading with a device that would transmit a signal in a non-electrical form, such as pneumatically, to the gauge. A mechanical device within the gauge would use the received pneumatic pressure to drive a mechanical assembly which would ultimately rotate a needle relative to the scale to indicate the measured value.

More recently, sensors producing an electrical output signal have been developed and popularized due to ever-increasing affordability and technology improvements. A common practice with this type of sensor is to transmit its electronic signal to a digital display, such as a liquid crystal display (LCD) or a light emitting diode (LED) display, to display the sensor's measurement value. While effective, this type of gauge is suboptimal for certain applications. For instance, gauges are often installed outdoors where LCD and LED displays have poor readability in direct sunlight.

Attempts have been made to use an analog gauge display with a sensor that produces an electric signal; however, these attempts have used expensive and inefficient components. There is a need for a lower cost and more efficient analog gauge capable of being used with a sensor that produces an electric signal.

SUMMARY

In one embodiment, a gauge system comprises a sensor that produces a sensor signal as a function of a sensed parameter. The gauge system also comprises a motor and a gauge having a scale and a movable indication needle that is driven by the motor and displays a calculated value of the sensed parameter based upon position of the needle relative to the scale. The gauge system further includes a position sensor that produces a position feedback signal representative of a sensed position of the needle and a controller that provides drive commands to the motor based on the sensor signal and the position feedback signal.

In another embodiment, a gauge system comprises a plurality of sensors that produce sensor signals as a function of sensed parameters. The gauge system further comprises a gauge assembly which includes a motor, a gauge having a scale and a movable indication needle that is driven by the motor and displays a calculated value of the sensed parameter based upon position of the needle relative to the scale, and a position sensor that produces a position feedback signal based upon sensed position of the needle. Also included in the gauge system is a controller that provides drive commands to the motor of the gauge assembly based on a calculated value and the position feedback signal.

Another embodiment includes a method for displaying a measurement on a gauge having a scale and a movable needle. A sensor signal representative of a sensed parameter is produced. Also, a calculated value as a function of the sensor signal is produced, which is then used to display a measurement of the sensed parameter by moving the needle relative to a scale. A position feedback signal representative of a sensed position of the needle is also produced, and a motor is driven to move the needle based upon the calculated value and the position feedback signal.

BRIEF DESCRIPTION OF THE DRAWINGS

FIGS. 2A and 2B are partial side cross-section views illustrating two gauge systems of the present disclosure.

DETAILED DESCRIPTION

According to this disclosure, a more economical and more efficient analog gauge system that is capable of displaying a measurement derived from an electronic signal can be created by utilizing a feedback position sensor in conjunction with a DC or AC motor and a control system. This not only saves cost over the prior art, but provides an accurately displayed measurement value with an ability to indicate error or component failure. Further, integrating a wireless transceiver into the system allows the gauge system to communicate with a wireless network.

Figure 1:
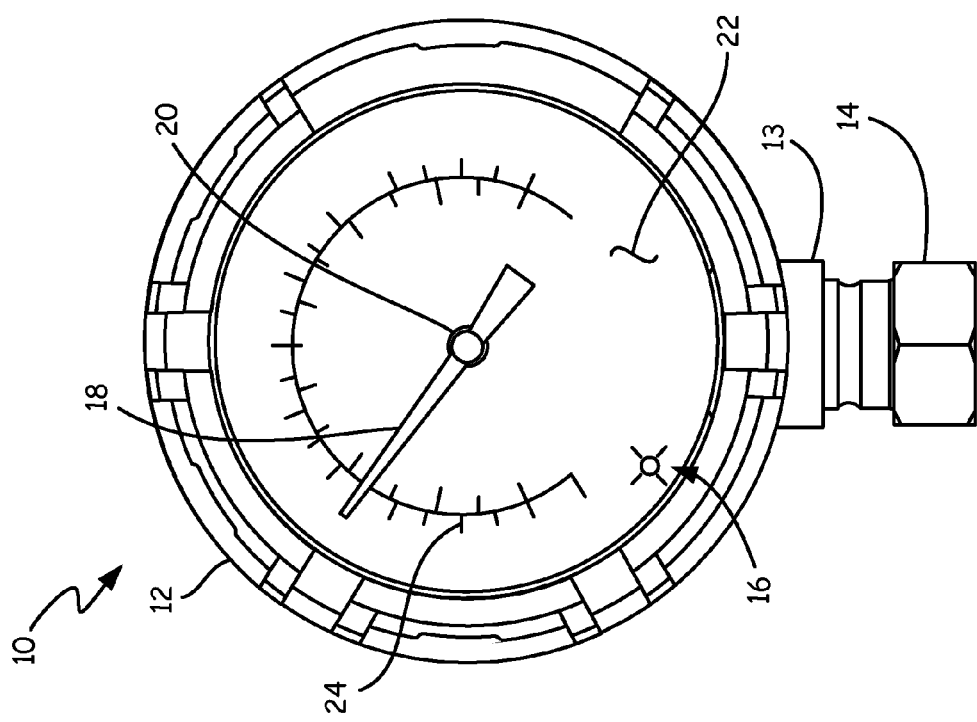
FIG. 1 is a front elevation view illustrating an embodiment of a gauge system in accordance with an embodiment of the present disclosure.

FIG. 1 is a perspective view of an embodiment illustrating gauge system 10, which includes housing 12, coupling 13, and sensor capsule 14. Housing 12 includes status indicator 16, indicator needle 18, drive shaft 20, and scale 22 (which includes scale markers or indicia 24 and scale fasteners 26).

Housing 12 is circular in profile, as depicted in FIG. 1; however, any other shape, such as square, rectangular, or elliptical may be used. In this embodiment, housing 12 and coupling 13 are connected to each other, either as a fully integrated component (such as a molded plastic assembly), or through fastening devices (such as a male and female threaded connection). Sensor capsule 14 connects to coupling 13 by a male and female threaded connection, but may also attach to coupling 13 by any other connecting device.

Status indicator 16, indicator needle 18, drive shaft 20, and scale 22 all reside within housing 12. Status indicator 16 is displayed as being located on the face of scale 22, but may be attached to any part of housing 12. Indicator needle 18 is attached to drive shaft 20. The proximal end of drive shaft 20 terminates inside indicator needle 18 or shortly after drive shaft 20 passes through indicator needle 18. The distal end of drive shaft 20 passes through scale 22, continuing to other components within gauge system 10.

Affixed to scale 22 are scale markers or indicia 24, which may be painted or printed onto scale 22. Scale markers or indicia 24 may also be applied to scale 22 by any connecting method, such as gluing or plastic welding. Scale markers or indicia 24 may be evenly spaced circumferentially around the outer perimeter of scale 22. Scale makers or indicia 24 may include a primary and secondary set of markers, as shown in FIG. 1.

Housing 12 encloses and protects all of the components within it. Sensor capsule 14 may be attached to a system process coupling (not shown) so that measurements of the process can be taken by the sensor within sensor capsule 14. In one embodiment, sensor capsule 14 may include a pressure sensor, which may be threaded on to a process system at a pressure port. The pressure sensor may then measure the pressure of the system process, convert the measurement into an electric signal, and send the signal on. Status indicator 16, affixed to the front of scale 22, visually indicates the status of gauge system 10.

Gauge system 10 displays a visual representation of a calculated value. A motor rotates drive shaft 20 in a clockwise or counterclockwise direction. Drive shaft 20, in turn, rotates indicator needle 18 in the same direction. Indicator needle 18 rotates relative to scale 22 and scale markers or indicia 24, which do not rotate. Scale markers or indicia 24 denote major steps of the units of the measurement value. For example, scale markers or indicia 24 may denote increments of 10 (as displayed) pounds per square inch of pressure for a gauge system displaying a pressure measurement, a secondary scale (as displayed) may also be used to indicate increments of kilopascals. The position of indicator needle 18 relative to scale 22 and scale markers or indicia 24 displays a visual representation of a measurement value.

According to one embodiment, FIG. 2A is a partial side cross-sectional view of gauge system 10A, primarily including the contents of housing 12. Within housing 12 are status indicator 16 (shown in FIG. 1), indicator needle 18, drive shaft 20, scale 22, scale fasteners 26, scale standoff mounts 28, and mounting plate 30. Also enclosed in housing 12 are motor 32, motor mount 34, feedback position sensor 36, and printed circuit board 38.

Pursuant to this embodiment, indicator needle 18 is attached to drive shaft 20. The proximal end of drive shaft 20 terminates inside indicator needle 18 or shortly after drive shaft 20 passes through indicator needle 18. Drive shaft 20 passes through scale 22, through mounting plate 30, and then into motor 32. Drive shaft 20, while shown directly coupled to motor 32 in the present embodiment, may also include a drive train having, for example, a gear set located between drive shaft 20 and motor 32. Drive shaft 20 then continues through motor 32 and into feedback position sensor 36, where the distal end of drive shaft 20 terminates. Drive shaft 20 is supported by bearings (not shown) within motor 32 and may be supported by additional bearings outside of motor 32.

Feedback position sensor 36 is electrically connected to printed circuit board 38 through a set of wires, a flex cable, a printed circuit, or any other means of transferring electric signals. Printed circuit board 38 is fastened, or otherwise secured, to housing 12 through screws, rivets, solder, glue, or any other fastening device.

In this embodiment, scale 22 contacts standoff mounts 28 and scale fasteners 26. Scale fasteners 26 pass through scale 22 and into scale standoff mounts 28. Scale fasteners 26 may be screws, rivets, or any other fastening device. Scale standoff mounts 28 contact scale 22 and are adhered or otherwise secured to mounting plate 30. Motor mount 34 is also mounted to mounting plate 30 and is attached to motor 32. Mounting plate 30 is fastened or integral to housing 12. Indicator needle 20 stands off from scale 22 and preferably does not make contact with scale 22.

Scale fasteners 26 hold scale 22 in place by securing scale 22 to standoff mounts 28, which holds scale 22 in a fixed position relative to mounting plate 30. Scale 22 may also be integral to housing 12, for example as a member of a common plastic injection molded assembly. Motor mount 34, being attached to both motor 32 and mounting plate 30, fixes the position of motor 32 relative to mounting plate 30. Mounting plate 30, being attached to housing 12, holds standoff mounts 28, scale 22, motor mount 34, motor 32, and drive shaft 20 in place relative to housing 12. Mounting plate 30 therefore maintains relative position between these components and printed circuit board 38 and feedback position sensor 36, which are also attached to housing 12. The securing of these components and their relative positions prolongs component life and increases the accuracy of the displayed measurement.

In this embodiment status indicator 16 is electrically connected to printed circuit board 38. Further, status indicator 16 is located on the face of scale 22 and physically mounted to printed scale 22 or mounting plate 30.

Gauge system 10A displays a visual representation of a measurement value. A controller and driver (shown in later figures) direct motor 34 to turn based on that measurement value. Motor 34 turns drive shaft 20 about its axis in either direction of rotation. Drive shaft 20, in turn, rotates indicator needle 18 in the same direction. As indicator needle 18 rotates its position, feedback position sensor 36 converts the position of drive shaft 20 to an electric signal, which is reported to the controller (shown in later figures). Indicator needle 18 rotates relative to scale 22, which does not rotate. The position of indicator needle 18 relative to scale 22 displays a visual representation of a calculated value.

According to another embodiment, FIG. 2B is a partial side cross-sectional view of gauge system 10B, which includes all of the components of gauge system 10A with the exception of mounting plate 30.

Pursuant to this embodiment, indicator needle 18 is attached to drive shaft 20. The proximal end of drive shaft 20 terminates inside indicator needle 18 or shortly after drive shaft 20 passes through indicator needle 18. Drive shaft 20 passes through scale 22, through feedback position sensor 36 and through printed circuit board 38. Drive shaft 20 then continues through printed circuit board 38, and then into motor 32. The distal end of drive shaft 20 terminates inside motor 32 or shortly after drive shaft 20 passes through motor 32. Drive shaft 20, while shown directly coupled to motor 32 in the present embodiment, may also include a drive train having, for example, a gear set. Drive shaft 20 is supported by bearings (not shown) within motor 32 and may be supported by additional bearings outside of motor 32.

In this embodiment, scale 22 contacts standoff mounts 28 and scale fasteners 26. Scale fasteners 26 pass through scale 22 and into scale standoff mounts 28. Scale fasteners 26 may be screws, rivets, or any other fastening device. Scale standoff mounts 28 contact scale 22 and are adhered or otherwise secured to printed circuit board 38. Motor mount 34 is also mounted to printed circuit board 38 and is attached to motor 32. Printed circuit board 38 is fastened or integral to housing 12. Indicator needle 20 stands off from scale 22 and preferably does not make contact with scale 22.

Scale fasteners 26 hold scale 22 in place by securing scale 22 to standoff mounts 28, which holds scale 22 in a fixed position relative to circuit board 38. Motor mount 34, being attached to both motor 32 and circuit board 38, fixes the position of motor 32 relative to circuit board 38. Printed circuit board 38, being attached to housing 12, holds standoff mounts 28, scale 22, motor mount 34, motor 32, and drive shaft 20 in place relative to housing 12.

In this embodiment status indicator 16 is electrically connected to printed circuit board 38. Further, status indicator 16 is located on the face of scale 22 and physically mounted to printed circuit board 38.

Gauge system 10B functions similarly to gauge system 10A to display a visual representation of a calculated value.

Figure 3:
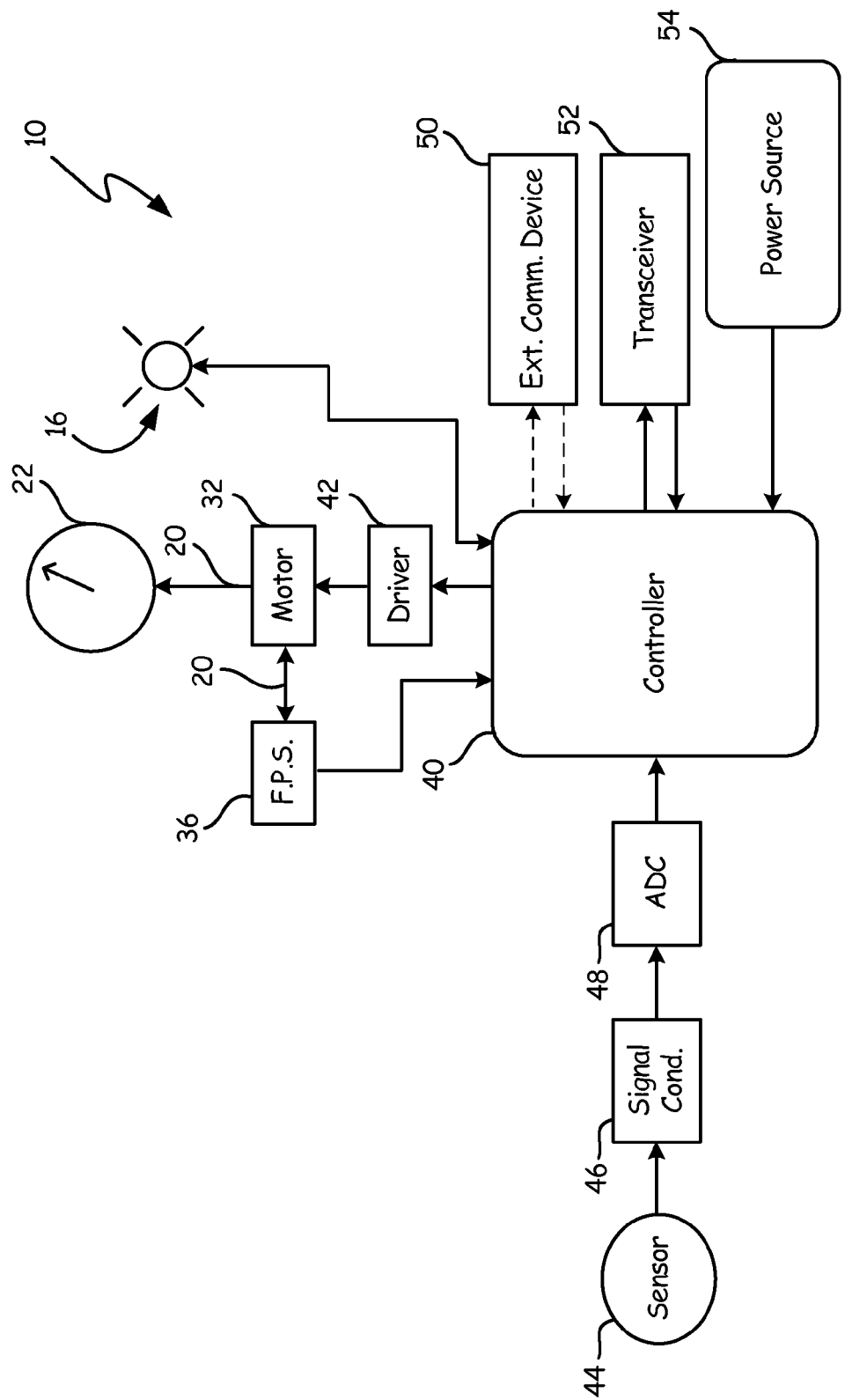
FIG. 3 is a block diagram illustrating an embodiment of a gauge system in accordance with an embodiment of the present disclosure.

FIG. 3 is a block diagram illustrating one embodiment of gauge system 10. The components of gauge system 10 include status indicator 16, scale 22, motor 32, drive shaft 20, feedback position sensor 36, motor driver 42, controller 40, sensor 44, sensor signal conditioner 46, analog to digital converter (ADC) 48, external communication device 50, transceiver 52, and power source 54.

Drive shaft 20 is coupled to motor 32, indicator needle 18, and feedback position sensor 36 (as shown in FIGS. 1 and 2). Feedback position sensor 36 is electrically connected to controller 40. Motor driver 42 is electrically connected to motor 32 and controller 40.

Sensor 44 is electrically connected to signal conditioner 46, which is electrically connected to ADC 48. ADC 48 connects electrically to controller 40. Controller 40 further connects electrically with status indicator 16, external communication device 50, transceiver 52, and power source 54.

Sensor 44 is mounted in a manner enabling it to detect a condition or parameter of a process or system such as pressure, temperature, humidity, level, vibration, light, sound, or force. Upon detection, sensor 44 produces an analog electric signal that is a function of the sensed condition or parameter. Signal conditioner 46 may filter, amplify, or perform any other process on the analog signal to allow controller 40 to accurately convert the signal from sensor 44 into a measurement value. ADC 48 converts the analog signal received from signal conditioner 46 into a digital signal that is sent to controller 40.

A circuit forming a communication port is electrically connected to controller 40. The communication port allows for communication between external communication device 50 and controller 40. The communication port may be included within housing 12, located on the back of housing 12, or any other place on gauge system 10. External communication device 50 is an external device comprising electrical components which interfaces with the communication port. This allows gauge system 10 to be configured for a network. For example, external communication device 50 may allow gauge system 10 to be integrated into a wireless network that communicates using the WirelessHART® protocol, according to IEC 62591.

During or following the configuration process, transceiver 52 allows gauge system 10 to send and receive communication packets through a wired or wireless connection to a remote network. For example, transceiver 52 may allow gauge system 10 to connect to a wireless mesh network having a WirelessHART® protocol, or transceiver 52 may allow gauge system 10 to connect to a wired network having the HART® protocol, or other fieldbus network.

Power source 54 provides electrical power to controller 40. Controller 40 may then determine the distribution of power to other devices requiring power, such as motor 32. Printed circuit board 38 distributes the power to any other device requiring power, after the power is regulated by a voltage regulator (not shown). This is especially important when power-saving methods are required or ideal, such as, for example, when a battery is used as a power source. Power source 54 may include a battery, or may be another source of AC or DC power. For example, power source 54 may be, or may receive power from a 4-20 milliamp circuit.

The calculated value displayed on gauge system 10 is determined by controller 40 based on two parameters. The first parameter is provided by feedback position sensor 36, which measures the position of drive shaft 20 and reports the detection to controller 40 in the form of an electric signal. The second parameter is provided by sensor 44 based on the condition sensor 44 has detected. Controller 40 converts the second condition received from sensor 44 into a rotational value parameter which is the setpoint for indicator needle 18. Multiple algorithms may then be used to derive an output, used to drive indicator needle 18.

In the next step of one embodiment, controller 40 uses an algorithm to compare the set point for indicator needle 18 with the position of drive shaft 20 as reported by feedback position sensor 36. Based on this comparison, the algorithm will determine whether indicator needle 18 needs to be rotated, and by how much. The result of the algorithm is an output signal. The output signal may be derived from a simple proportional algorithm based on the second parameter, derived from a proportional-integral algorithm (PI), derived from a proportional-integral-derivative (PID) algorithm, or any other algorithm capable of creating an output signal. The output signal sent is to driver 42, which ultimately results in a rotation of indicator needle 18 as illustrated and described in FIGS. 1 and 2. Feedback position sensor 36 will sense the new position of indicator needle 18 and provide a signal back to controller 40, creating a constant feedback loop regarding the position of indicator needle 18. Thereafter, controller 40, through another algorithm, determines if indicator needle 18 is positioned accurately by comparing the new value of the first parameter with the set point. The second algorithm may be proportional, PI, or PID. If indicator needle 18 is not positioned correctly, another output signal is created and sent to driver 42. Ultimately, the first and second algorithms will work together to display an accurate calculated value.

In another embodiment, controller 40 uses an algorithm to compare the setpoint for indicator needle 18 with the position of drive shaft 20 as reported by feedback position sensor 36. The algorithm will determine whether indicator needle 18 needs to be rotated, and by how much. The result of the algorithm is an output signal that has already been adjusted for error. The output signal may be derived from a simple proportional algorithm based on the two parameters, derived from a PI algorithm, or derived from a PID algorithm, or any other algorithm capable of creating an output signal. The output signal sent is to driver 42, which ultimately results in a rotation of indicator needle 18 as illustrated and described in FIGS. 1 and 2. Following the movement of indicator needle 18, feedback position sensor 36 will sense the position of indicator needle 18 and provide a signal back to controller 40, creating a constant feedback loop regarding the position of indicator needle 18.

Figure 4:
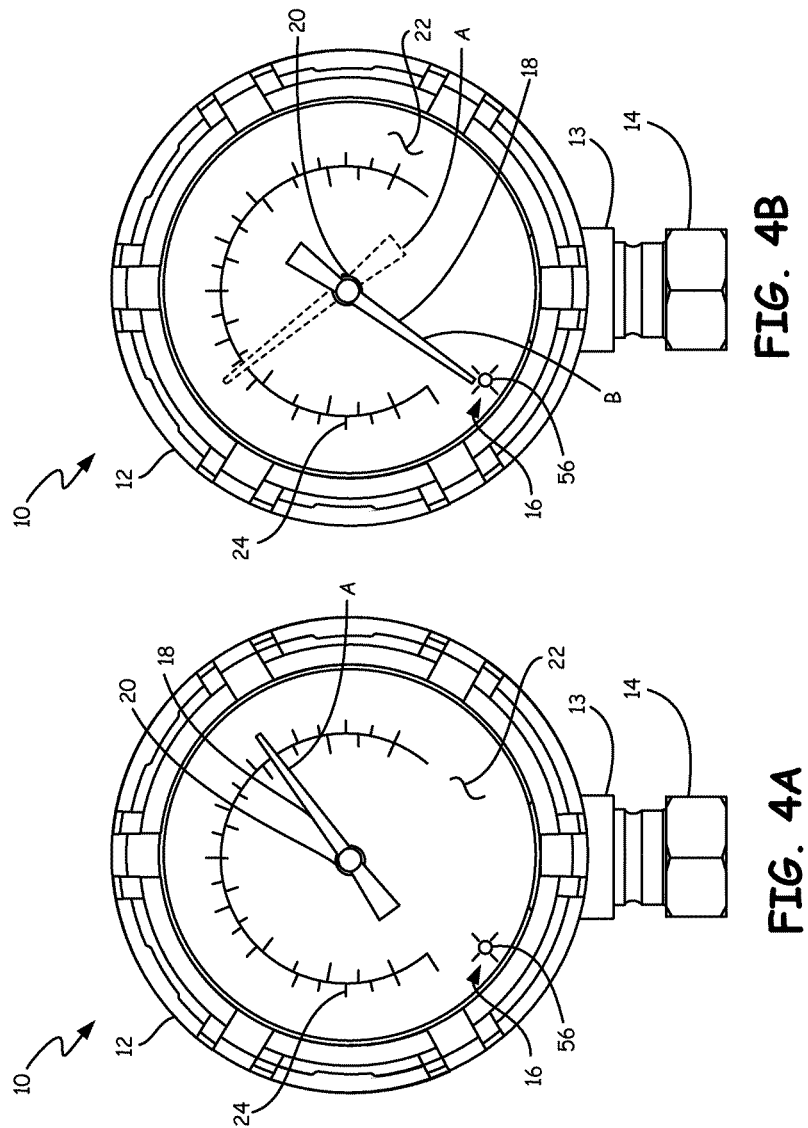
FIGS. 4A and 4B are front elevation views illustrating two operating conditions of the gauge system of FIG. 1.

FIGS. 4A and 4B are front elevation views illustrating two operating conditions of an embodiment of a gauge system of the present disclosure. FIGS. 4A and 4B contain the same components of and operate in accordance with the embodiments illustrated in FIGS. 1-3. However, FIGS. 4A and 4B further illustrate the operation of status indicator 16.

Gauge system 10 includes housing 12, sensor capsule 14, and status indicator 16. Housing 12 includes indicator needle 18, drive shaft 20, and scale 22. Status indicator 16 includes indicator light 56. Also shown in FIGS. 4A and 4B is calculated indicator needle position A.

Housing 12 encloses and protects all of the components within it. Sensor capsule 14 may be attached to a system process coupling (not shown) so that measurements of the process can be taken by sensor 44, which may be positioned within sensor capsule 14. Indicator light 56, of status indicator 16, is located on scale 22.

Status indicator 16 is wired to controller 40. Status indicator 16 provides a means to visually indicate whether indicator needle 18 is correctly positioned relative to scale 22. In this embodiment, status indicator 16 uses a single, two color LED (green and red), but may use two separate LEDs (one green and one red), or any other low power lights in any other color.

Motor 32, of gauge system 10, rotates drive shaft 20 in a clockwise or counterclockwise direction. Drive shaft 20, in turn, rotates indicator needle 18 in the same direction. Indicator needle 18 rotates relative to scale 22 and scale markers or indicia 24, which do not rotate. Scale markers or indicia 24 denote major steps of the units of the calculated value, such as 10 pounds per square inch of pressure. The position of indicator needle 18 relative to scale 22 and scale markers or indicia 24 displays a visual representation of a calculated value. Indicator needle setpoint A represents the desired position of indicator needle 18 based on multiple parameters, while sensed indicator needle position B is the sensed location of the needle based on position feedback information received from position feedback sensor 36.

Controller 40 knows both of these positions. Controller 40 determines the sensed location of indicator needle 18 based on signals received from feedback position sensor 36, and controller 40 determines indicator needle setpoint A from a calculation performed based on two parameters as illustrated and described in FIG. 3. Controller 40 then compares the sensed indicator needle position B with indicator needle setpoint A. When sensed indicator needle position B and indicator needle setpoint A are aligned, as shown in FIG. 4A, controller 40 will send a signal to status indicator 16 to illuminate indicator light 56, in one color, such as green. In this embodiment, indicator light 56 is a dual color LED. When sensed indicator needle position B and indicator needle setpoint A are not aligned, as shown in FIG. 4B, controller 40 will send a signal to status indicator 16 to illuminate indicator light 56 in another color, such as red. Controller 40 may also send a signal to status indicator 16 to flash indicator light 56 in a color, such as red. This visual indication method notifies an on-site user or inspector that the reading displayed is not within a predetermined tolerance of precision. This notification method is useful for reporting errors as well as component failures, and is also useful for startup and configuration of gauge system 10.

Status indicator 16 may also be useful for reporting other errors within gauge system 10. For example, in an embodiment where a battery is used as a power source, status indicator 16 may emit a flashing red light from indicator light 56 when the power level of the battery drops below a predetermined setting. In another embodiment, status indicator 16 may emit a red light from indicator light 56 when the sensed parameter or an ambient temperature is out of range. In another embodiment, status indicator 16 may emit a flashing red light from indicator light 56 when communication connectivity is lost. Other errors may also be indicated through status indicator 16 by illuminating indicator light 56.

In another embodiment, controller 40 may direct indicator needle 18 to point off-scale, or in an area where there are no scale markers or indicia 24 (as shown in FIG. 4B), when any of the errors listed above are detected. Further, indicator needle 18 may be driven to point to status indicator 16, serving as another visual indication that there is an error. This provides redundancy to status indicator 16 in the case where indicator light 56 fails or malfunctions.

Figure 5:
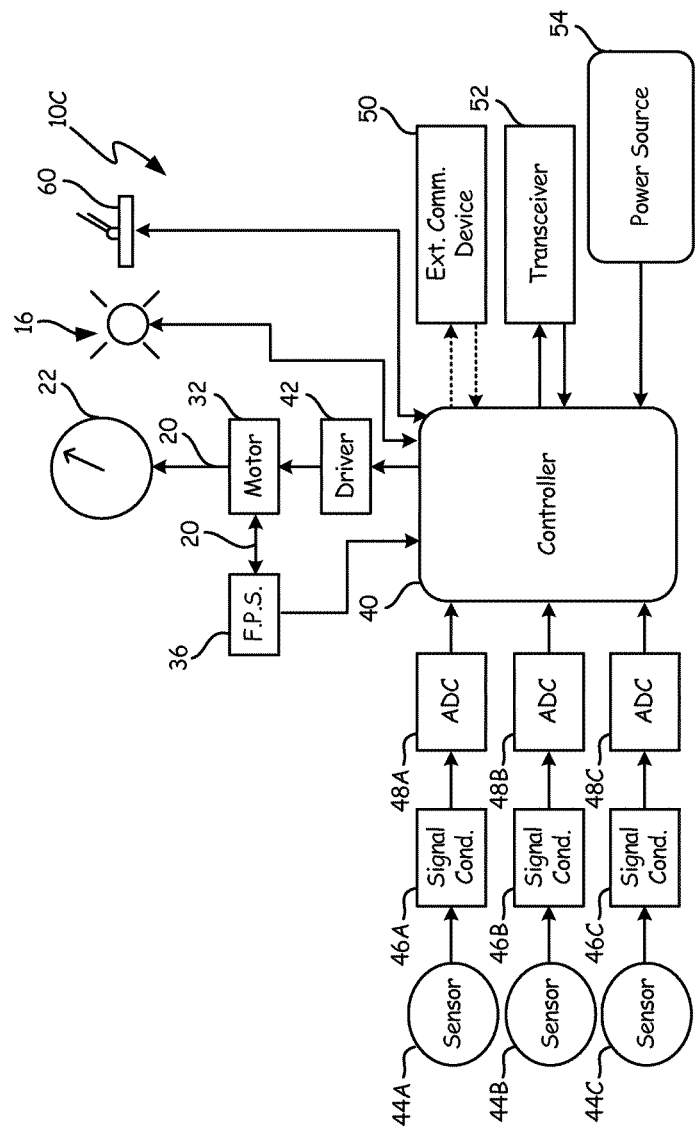
FIG. 5 is a block diagram illustrating an embodiment of a gauge system in accordance with another embodiment.

FIG. 5 is a block diagram of gauge system 10C in accordance with another embodiment. Gauge system 10C contains the same components of and operates in accordance with the embodiments illustrated in FIGS. 1-4B, with the exception that sensor capsule 14 is not directly connected to coupling 13 in some embodiments. Also, gauge system 10C further shows display selection device 60, sensors 44A-44C, signal conditioners 46A-46C, and ADCs 48A-48C.

In this embodiment, the components of gauge system 10C are connected, attached, and positioned consistently with the components of gauge system 10 of FIGS. 1 through 4B and their descriptions. Additionally, sensor 44A is electrically connected to signal conditioner 46A, which is electrically connected to ADC 48A. ADC 48A connects electrically to controller 40. Sensors 44B and 44C are similarly connected to signal conditioners 48B and 48C, and ADC 48B and ADC 48C. ADC 48B and ADC 48C also connect electrically to controller 40. Display selection device 60 is also electrically connected to controller 40.

Gauge system 10C illustrated in FIG. 5 functions in accordance with FIGS. 1-4B; however, gauge system 10C differs in that controller 40 receives three different sensor signals from sensors 44A-44C. The embodiment illustrates three sensors; however, it is to be understood that any number of sensors could connect to controller 40.

Upon receiving multiple sensor signals, controller 40 can calculate and send an output signal to driver 42 based on the sensor signal inputs from any of sensors 44A-44C. This allows gauge system 10A to display any one of multiple calculated values on a single gauge display. Display selection device 60 allows a local user to switch the calculated value displayed on gauge system 10C. For example, a local user may approach gauge system 10C, note that display selection device 60 is set to display the calculated value based on a reading from sensor 44A, and then use display selection device 60 to toggle gauge system 10C to display the calculated value based on a reading from sensor 44B or 44C. Display selection device 60 may be a three-position toggle switch or any other device allowing a user to manually switch which calculated value is displayed on gauge system 10C.

Regardless of which measurement is displayed, position feedback sensor 36 will detect the position of indicator needle 18 relative to scale 22 and scale markers or indicia 24. Controller 40 can then compare sensed indicator needle position B with indicator needle setpoint A based on the currently displayed calculated value. This would allow for a service person to quickly take readings from multiple sensors while allowing the accuracy of the display to be quickly discerned by looking at status indicator 16. All of this may be done through a single gauge display, which saves money.

In another example, display selection device 60 may be integral to controller 40 and accessed by a user through transceiver 52. In this configuration, controller 40 may output which of the calculated values is currently displayed on gauge system 10C. Also, a local or remote user may communicate to controller 40 that gauge system 10C is to display a different variable than what is currently being displayed. All of these functions offer the advantage of remotely controlling a sensor and gauge system. In addition, this functionality may be used to communicate other errors such as low battery or sensed parameter out of range.

Figure 6:
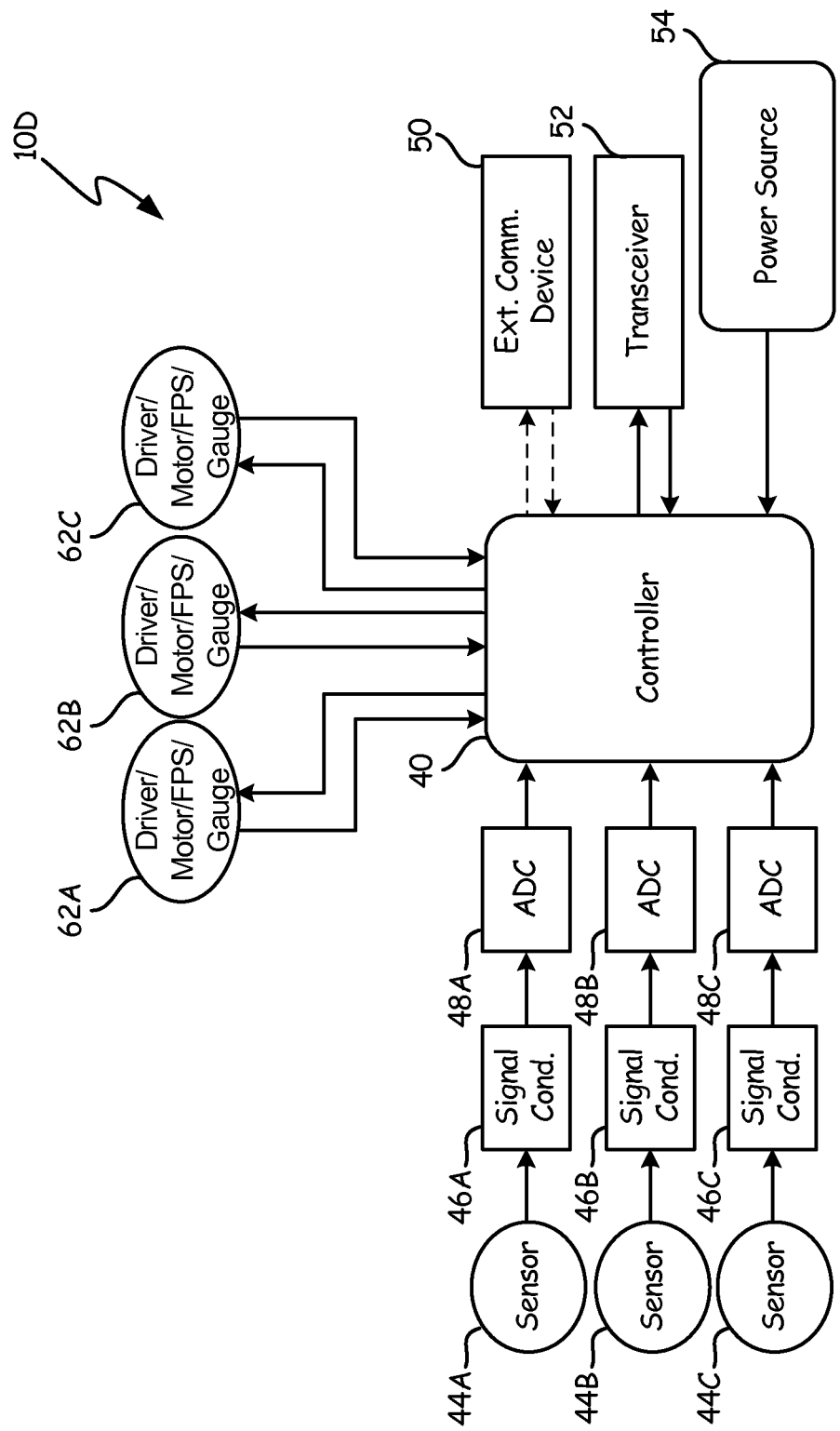
FIG. 6 is a block diagram illustrating an embodiment of a gauge system in accordance with an additional embodiment.

FIG. 6 is a block diagram illustrating an embodiment of gauge system 10D in accordance with an additional embodiment. Gauge system 10D illustrated in FIG. 6 functions in accordance with gauge systems 10A, 10B, and 10C of FIGS. 1-5; however, gauge system 10D differs in that controller 40 is connected to gauge assemblies 62A-62C and that sensor capsule 14 is not directly connected to coupling 13. Each of gauge assembly 62A-62C includes all of the features of FIGS. 1, 2, 4A and 4B, as well as driver 42 of FIG. 3 and display switching device 60 of FIG. 5. The embodiment illustrates three gauge assemblies; however, it is to be understood that any number of gauge assemblies could connect to controller 40. Gauge assemblies 62A-62C may have an analog display as described in FIGS. 1-5 and may also be digital.

Pursuant to this embodiment, upon receiving multiple sensor signals from sensors 44A-44C, controller 40 can calculate a measurement value to be outputted to driver 42 of any of gauge systems 62A-62C based on any of the sensor signal inputs. This allows gauge systems 62A-62C to display calculated values based on sensors 44A-44C simultaneously. Display selection device 60 allows a local user to switch which calculated value is displayed on gauge systems 62A-62C. For example, a local user may approach gauge system 62A, note that the switch is set to display the calculated value based on a reading from sensor 44B, and then use display selection device 60 to toggle gauge system 62A to display the calculated value based on a reading from sensor 44A or 44C.

Regardless of which measurement is displayed, the feedback position sensor will detect the position of indicator needle 18 relative to scale 22 and scale markers or indicia 24 of gauge systems 62A-62C. Controller 40 can then compare the sensed indicator needle position 18 with indicator needle setpoint A based on the currently displayed calculated value. Controller 40 can then illuminate light 56 depending on whether sensed indicator needle position B is in alignment with indicator needle setpoint A. This would allow for a service person to quickly take readings from multiple sensors while quickly discerning the accuracy of the display by looking at status indicator 16 of gauge systems 62A-62C.

Further, this embodiment provides redundancy and trouble-shooting abilities. For example, assume gauge system 62C is displaying the calculated value based on the output signals from sensor 44C, and status indicator 16 is displaying the status of gauge system 62C. And, assume status indicator 16 indicates to a local user that sensed indicator needle position B and indicator needle setpoint A are not aligned, as shown in FIG. 4B, by illuminating indicator light 56. The local user may then use display selection device 60 of gauge system 62A to display the calculated value based on the output signals from sensor 44C. Depending on whether status indicator 16 of gauge system 62A changes or not, a local user can quickly determine whether a component within gauge system 62C is the source of the error or whether sensor 44C (or another component transferring the signal from sensor 44C) is the source of the error.

In the same manner, controller 40 may be programmed to automatically perform this check upon detection that the sensed position of indicator needle 18 and indicator needle setpoint A are not aligned. Controller 40 can then report the error locally, or may transmit the error to a remote user or program over a wired or wireless medium through transceiver 52. Controller 40 can also determine which combination of gauges and sensors resulted in misaligned needle positions. Based on these determinations, controller 40 can then transmit whether the other sensors and gauge systems are experiencing similar errors along with a diagnostic of the problem. This would allow for prompt service and troubleshooting of the specific sensor or gauge assembly, saving time and money lost due to errant measurement or recordation, and by expediting the process of trouble-shooting. Similar trouble-shooting and analysis may be performed with the embodiment shown in FIG. 5.

The motor 32 used to drive shaft 20 may be a standard brushed DC or standard brushless AC motor, but may also be any motor capable of rotating a shaft. Further, motor 32 may be a solenoid motor or stepper motor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

We claim:

1. A gauge system comprising:
   a sensor that produces a sensor signal as a function of a sensed parameter;
   a motor;
   a gauge having a scale and a movable indication needle that is driven by the motor and displays a calculated value of the sensed parameter based upon position of the needle relative to the scale;
   a position sensor that produces a position feedback signal representative of a sensed position of the needle;
   a controller that provides drive commands to the motor based on the sensor signal and the position feedback signal; and
   a status indicator, responsive to the controller, which indicates whether the position feedback signal and the calculated value are in alignment so that the calculated value displayed by the gauge is within a predetermined tolerance of precision based upon a comparison by the controller of the position feedback signal and the sensor signal.

2. The system of claim 1 wherein the controller produces an output signal that is a function of the sensed parameter.

3. The system of claim 2 and further comprising a wireless transceiver that is electrically connected to the controller; wherein the output signal is wirelessly transmitted by the wireless transceiver.

4. The system of claim 2, wherein the output signal is transmitted to a second gauge display.

5. The system of claim 4, wherein the second gauge display is an analog display.

6. The system of claim 1 wherein the status indicator also indicates other errors of the gauge system.

7. The system of claim 1 wherein the status indicator comprises a single or multiple LEDs.

8. The system of claim 1, wherein the sensor is at least one of a pressure, temperature, humidity, level, vibration, light, sound, or force sensor.

9. A gauge system comprising:
a plurality of sensors that produce sensor signals as a function of sensed parameters;
a gauge assembly comprising:
 a motor;
 a gauge having a scale and a movable indication needle that is driven by the motor and displays a calculated value of the sensed parameter based upon position of the needle relative to the scale; and
 a position sensor that produces a position feedback signal based upon sensed position of the needle;
a controller that provides drive commands to the motor of the gauge assembly based on the sensor signal and the position feedback signal; and
status indicators, responsive to the controller, which indicate whether the sensor signal and the feedback signal are in alignment so that the calculated value displayed by the gauge is within a predetermined tolerance of precision.

10. The system of claim 9, wherein the controller provides drive commands to the motor based on one of the sensor signals and the position feedback signal.

11. The system of claim 10, and further comprising a display selection device for selecting which sensor signal's calculated value is displayed.

12. The system of claim 9 and further comprising a plurality of gauge assemblies, wherein the motor of each gauge assembly receives a drive signal from the controller based on the sensor signal and the position feedback signal from the position sensor of that gauge assembly.

13. The system of claim 12 and further comprising one or more wireless transceivers electrically connected to the controller; wherein the sensor signals are wirelessly transmitted by the wireless transceiver.

14. The system of claim 9 wherein the status indicator indicates other errors of the gauge system.

15. The system of claim 9 wherein the status indicator comprises a single or multiple LEDs.

16. The system of claim 12, and wherein each gauge assembly further comprises a display selection device for selecting which calculated value is displayed.

17. The system of claim 9, wherein at least one sensor is at least one of a pressure, temperature, humidity, level, vibration, light, sound, or force sensor.

18. A method for displaying a measurement on a gauge having a scale and a movable needle, the method comprising:
producing a sensor signal representative of a sensed parameter;
producing a calculated value as a function of the sensor signal;
displaying a measurement of the sensed parameter based on position of the needle relative to a scale;
producing a position feedback signal representative of a sensed position of the needle;
driving a motor to move the needle based upon the calculated value and the position feedback signal;
comparing the position feedback signal and the calculated value; and
providing a status indication, based upon the comparing, of whether the position feedback signal and the calculated value displayed by the gauge is within a predetermined tolerance of precision.

* * * * *